Aug. 10, 1943.  D. G. JONES  2,326,464
RADIAL CYLINDER MOTOR AND THE LIKE
Filed Aug. 2, 1941   3 Sheets-Sheet 3

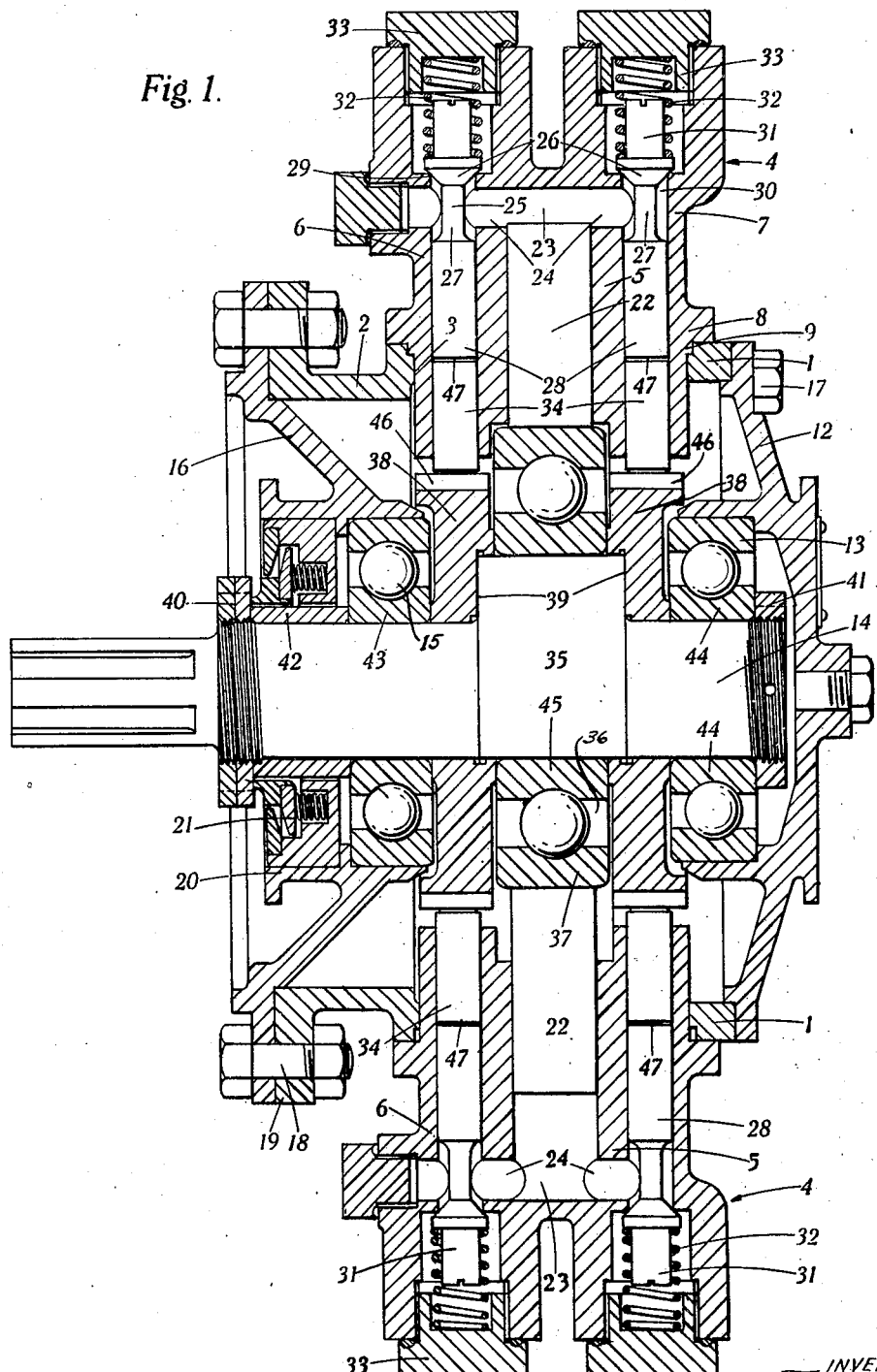
Fig. 1.

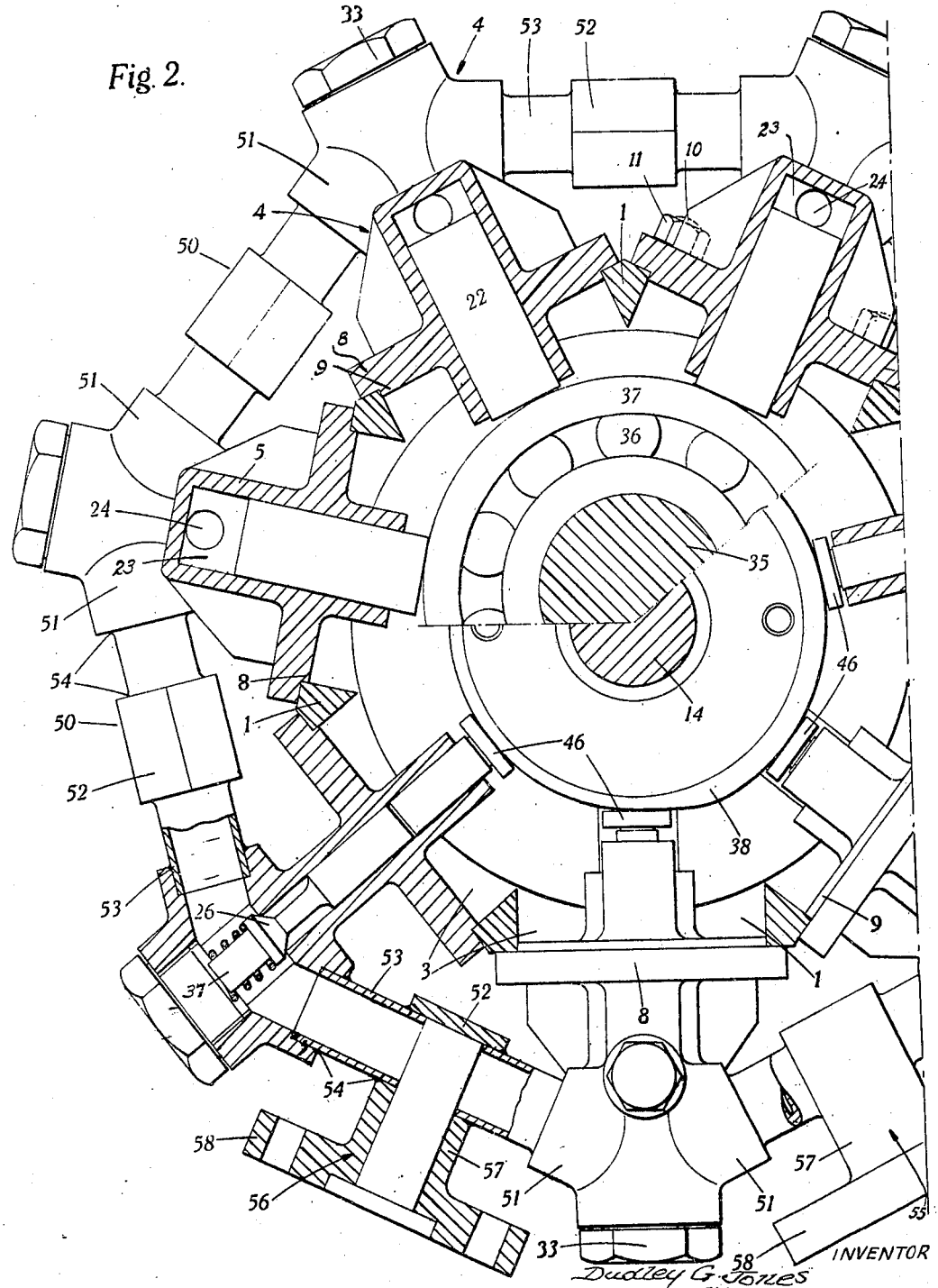

INVENTOR
Dudley G. Jones
BY
ATTORNEY

Patented Aug. 10, 1943

2,326,464

UNITED STATES PATENT OFFICE 2,326,464

RADIAL CYLINDER MOTOR AND THE LIKE

Dudley George Jones, Aldwych, London, England

Application April 2, 1941, Serial No. 386,549
In Great Britain April 2, 1940

6 Claims. (Cl. 121—120)

This invention has reference to an improved fluid engine, i. e., an air, steam or liquid driven motor or a pump, having radial cylinders.

According to one feature of the invention the engine is built up from three or more similar or substantially similar units comprising working cylinders and valve casings arranged symmetrically around the engine shaft, the valve cylinders being divided into two sets for oppositely flowing inflow and discharge fluid.

Each unit may comprise a working cylinder and the casings of its allotted valves (two) made as a one piece body adapted to be secured to the engine casing or each unit may be built up from tubes brazed or welded together.

In the accompanying drawings:

Fig. 1 is a side elevation, in section, of a motor constructed in accordance with the invention;

Figure 2A:
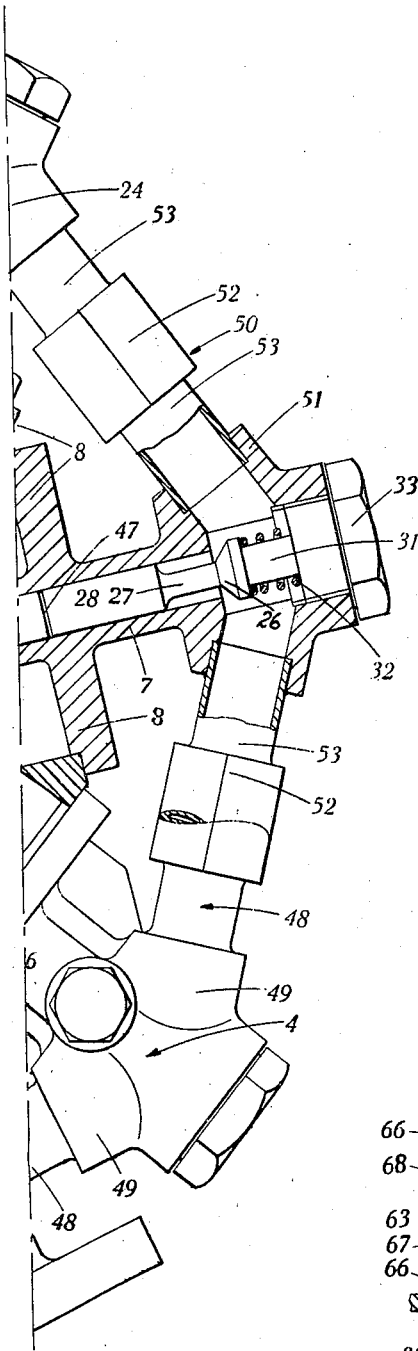
Fig. 2 is a front elevation of the motor, partly in section.

In Figs. 1 and 2 the main part of the motor casing is in the form of a regular seven sided part 1 and a co-axial and integral cylindrical part 2 of slightly smaller diameter at one end of the part 1. The sides of the part 1 each have an opening 3, the axes of the openings being in a common plane at right angles to the casing axis. Units 4 each comprising a working cylinder 5 integral with and located centrally of two parallel valve casings 6 and 7 in the form of cylinders are introduced into the openings 3. The units have flanges 8 intermediately of their ends. The flanges are stepped to provide shallow spigots 9 snugly fitting the openings and are bored to permit of the passage through them of fixing studs as 10 (Fig. 2) projecting from the casing part 1, the studs having nuts 11.

An end plate 12 carries a ball bearing 13 supporting one end of the shaft 14 of the motor whilst the shaft is supported near its coupling end by a ball bearing 15 carried by a conical end plate 16. The plate 12 is secured to the casing by studs and bolts as 17 and the plate 16 by bolts and nuts 18, the part 2 of the casing being flanged at 19 for this purpose. The plate 16 has a re-entrant boss 20 accommodating a seal 21 of known construction, said seal being a tight fit in the boss and preventing leakage of oil along the internal surface of the boss and past the end of the shaft.

The cylinders 5 contain plungers or pistons 22. The plungers are shown as being plain but they may be provided with cup leathers, rings or other known sealing devices.

The valve cylinders 6 are located in front of the cylinders 5 and the valve cylinders 7 behind cylinders 5 and the cylinders of each unit communicate with each other by way of the working chamber 23 of the unit and lateral bores 24 in the cylinder walls. In each valve cylinder is a valve body 25 comprising a poppet head 26, a neck portion 27 and a stem 28, the head resting on a seat 29 at the outer side of the corresponding lateral bore and the stem 27 being on the inner side of the lateral bore so that fluid in the chamber 30 with which the bore communicates presses on substantially equal areas of the valve body when the valve is closed and, therefore, "balances" the said body. Each head 26 has an extension 31 entering the hollow of a helical valve spring 32 which presses at one end against the head and at the other end against bushings 33 screwing into the outer ends of the cylinders 6 and 7, said ends being of larger diameter than the portions receiving the stems 28. Tappets 34 are disposed in the inner ends of the valve cylinders.

The shaft 14 has an eccentric or crank 35 receiving a ball bearing 36, the crank and bearing being so located that the corresponding ends of the plungers 22 bear against the outer race 37 of the bearing 36. Thus, the shaft, through the bearing 36 and the crank, is rotated when fluid under pressure acts on certain plungers.

Two similar cams 38 are arranged on the shaft one on one side of the crank and one on the other side thereof. The faces of the cams adjacent to the crank are recessed at 39 and the recesses are shaped snugly to receive the ends of the crank. Fixing nuts 40, 41 on the plain ends of the shaft 14 hold the cams in this position by inward thrust. That is to say, the nuts 40, thrusting against a sleeve 42 in the core of the seal 21 and against the inner race 43 of the bearing 15, press the left hand cam against the crank and the nuts 41, thrusting against the inner race 44 of the bearing 13, press the right hand cam against the crank.

The bearing 36 is centralised on the crank 35 by the cams 38 which press against its inner race 45.

The tappets 34 have enlarged ends 46 and the cams, as will be seen, are so positioned that the said ends press against their profiles. In order to ensure proper working contact between the cams and the tappets whether or not the valve heads are seated shims 47 are located between the tappets and the valve stems. In practice, each valve and its tappet are made of such length as to leave a gap between the ends of each and this gap is filled by the shim (the shim thickness varying from, say .010" to .002") until the requisite clearance (e. g., .002") is obtained between the enlargement 46 and the "dead" portion of the corresponding cam.

The valve cylinders 6 are connected together in series by unions as 48 which take into bosses 49 at the sides of the enlarged or outer ends of the cylinders and the valve cylinders 7 are similarly connected together by unions 50 taking into like bosses 51 on said cylinders 7.

Each union comprises a centre socket 52 into which two spigot-like tubes 53 can telescope. This telescoping enables the tubes to be introduced into the bosses 49 and 51 as shown when the units 4 are in position on the casing. Finally, the parts 53 are sealed to the bosses and to their sockets by soldering or the like as indicated at 54.

One union 48 is provided with a pipe coupling 55 and a union 50 with a like coupling 56, said coupling comprising tubular parts 57 communicating with the hollow of the sockets 52 and terminating in coupling flanges 58. The couplings allow fluid to be supplied to and exhausted from the motor in either sense and, as will be understood the crank 35, and the cams are so set relatively that fluid is appropriately supplied to and exhausted from the working cylinders (by way of the unions and the lateral bores 24) whilst the shaft 14 rotates in the direction determined by which of the couplings the fluid is introduced. To reverse the motor all that has to be done is to reverse the fluid flow.

To ensure practically constant torque of the motor even at low speeds the valves are of "dead-tight" shut type and all possible leakage zones have long seals, i. e., long plungers 22, long valve stems 28 and long tappets 34. Such a motor is ideally suited for sensitive "inching."

Figure 3:
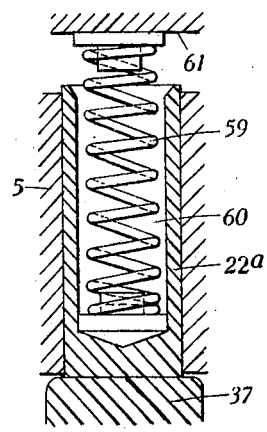
Fig. 3 is a fragmentary view of a spring plunger or piston in a pump cylinder.

If the shaft 14 is rotated and the incoming fluid pressure is sufficient to keep the plungers in contact with the race 37 the machine acts as a pump. When the machine is required for use as a pump it is desirable, however, to keep the plungers in contact with the race by mechanical means. One such means is illustrated in Fig. 3. It comprises a compression spring 59 having one of its ends extending into the bore 60 in the plunger 22ᵃ and its other end pressing against the head 61 of the cylinder 5.

Figure 4:
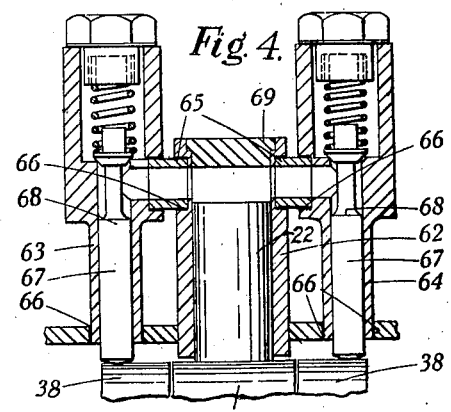
Fig. 4 is a fragmentary view of a fluid engine wherein the working cylinder and the valve casings comprise welded or brazed tubes.

The motor or pump may be built up from units brazed or welded together. Such a construction is shown in Fig. 4. In this case tubes 62, 63 and 64 equivalent to the cylinders 5, 6 and 7, respectively (Figs. 1 and 2) are brazed, welded or otherwise secured to the casing 1 and lateral tubes 65 brazed or welded to the cylinders perform the function of the lateral bores 24. The brazing or welding is indicated by 66. The stems 67 of the valve bodies 68 make direct contact with the cams 38. Tappets and shims may be used as described with reference to Figs. 1 and 2. The outer end of the tube 62 is closed by a plug 69. Unions equivalent to 48 and 50 are secured to the tubes forming the valve cylinders and two of such unions have couplings equivalent to 55 and 56. The casing equivalent to 1 may be built up from elements brazed or welded together.

The motor may be secured to the casing of the machine which it drives by means of bolts passing through the holes in the flange 18 and in the plate 16.

What I claim is:

1. A fluid engine comprising a casing formed with a series of radially disposed openings, an integral unit removably mounted in each opening and extending inwardly of the casing, a power shaft mounted at the axis of the casing, each unit being formed to provide a working cylinder and valve cylinders on opposite sides of the working cylinder in a plane containing the axis of the casing, an eccentric on the power shaft in line with the working cylinders of the respective units, a bearing encircling the eccentric, said cams being formed on the surfaces adjacent the eccentric with recesses to snugly receive the adjacent ends of the eccentric, a cam on the power shaft on each side of the eccentric, a piston in the working cylinder of each unit to cooperate with the bearing overlying the eccentric, a valve in each valve cylinder cooperating with the cam in line therewith, and independent means arranged wholly beyond the casing to establish free communication between all of the similar valve cylinders of the respective units wholly beyond the valve therein.

2. A construction as defined in claim 1 including end plates for closing the ends of the casing, and anti-friction bearings carried by the end plates for supporting the power shaft.

3. A construction as defined in claim 1 wherein means are arranged to cooperate with the power shaft to exert axial stress on the respective cams, and maintain them in cooperation with the eccentric.

4. A fluid engine according to claim 1, said working cylinders being located centrally of said control valves and said eccentric body being located between said cams, the cams having recesses conforming to the shape of the eccentric body and said reesses receiving the ends of said body.

5. A fluid engine according to claim 1, said working cylinders being located centrally of said control valves and said eccentric body being located between said cams, the cams having recesses conforming to the shape of the eccentric body and said recesses receiving the ends of said body, and an anti-friction bearing surrounding the eccentric body, said cams centering the bearing on the eccentric body by pressing against the sides of the bearing.

6. A fluid engine according to claim 1, said working cylinders being located centrally of said control valves and said eccentric body being located between said cams, the cams having recesses conforming to the shape of the eccentric body and said recesses receiving the ends of said body, and an anti-friction bearing surrounding the eccentric body, said cams centering the bearing on the eccentric body by pressing against the sides of the bearing, an anti-friction bearing on the shaft at that side of one cam remote from the eccentric body and an anti-friction bearing on the shaft at that side of the other cam remote from said body and clamping means on said shaft, said means being adjusted to thrust the bearing on the shaft against the cams and to thrust the cams against the eccentric body and the anti-friction bearing surrounding it.

DUDLEY GEORGE JONES.